UNITED STATES PATENT OFFICE.

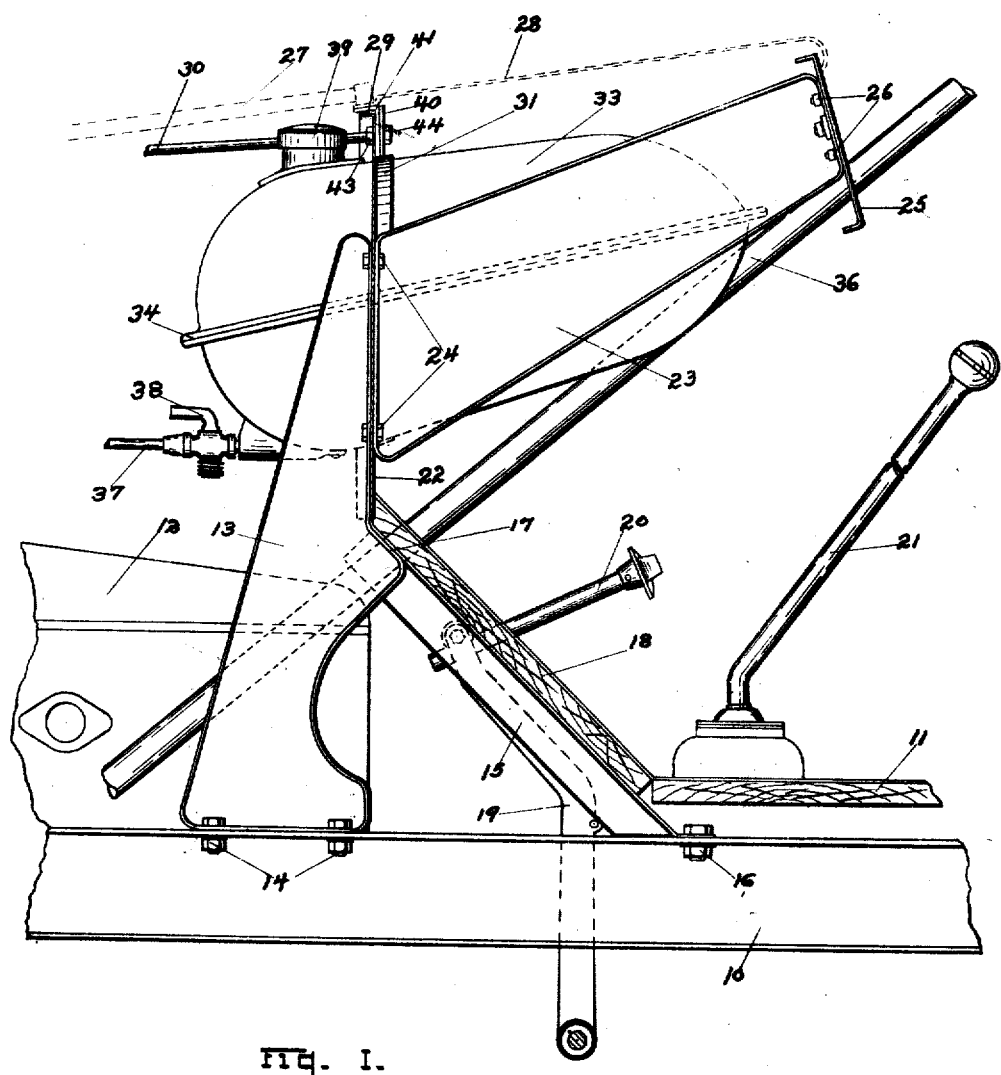

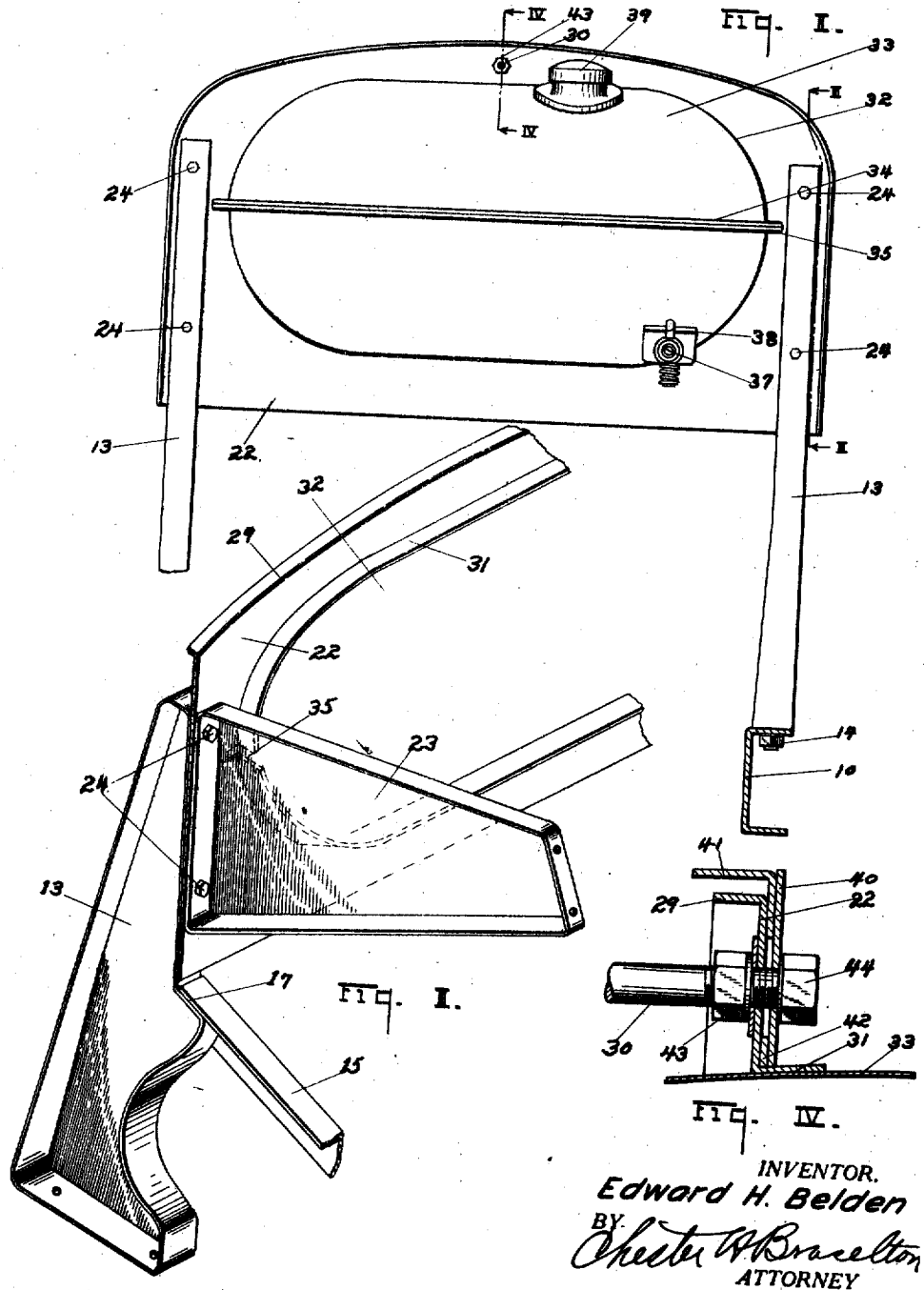

EDWARD HALL BELDEN, OF TOLEDO, OHIO, ASSIGNOR TO INDUSTRIAL RESEARCH CORPORATION, OF TOLEDO, OHIO, A CORPORATION OF DELAWARE.

MOTOR-VEHICLE.

1,335,720.

Specification of Letters Patent.

Patented Apr. 6, 1920.

Application filed June 15, 1918. Serial No. 240,112.

*To all whom it may concern:*

Be it known that I, EDWARD H. BELDEN, a citizen of the United States, residing at Toledo, in the county of Lucas and State of Ohio, have invented certain new and useful Improvements in Motor-Vehicles, of which I declare the following to be a full, clear, and exact description.

This invention relates to motor vehicles and has for its object to provide more particularly, improvements in the construction and the manner of supporting the fuel supply tank thereon.

Another object of my invention is to provide improved means for supporting and bracing the dash and the fuel tank directly from the frame of the vehicle and in such a way that the tank may be inclosed within the cowl or body and readily removed therefrom when the latter is mounted on the chassis.

A further object of my invention is to provide a fuel tank which is so mounted within the cowl of the motor vehicle that it may be very readily and conveniently filled from a point considerably in front of the instrument board.

Further objects, and objects relating to economies of manufacture and details of construction, will definitely appear from the detailed description to follow. I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which:

Figure I is a fragmentary, side elevation of a portion of the vehicle frame showing the manner of supporting and bracing the fuel tank and instrument board.

Fig. II is a fragmentary, front elevation showing the supports for the dash and the fuel tank.

Fig. III is a view in perspective of one of the dash supporting standards, together with the dash and one of the arms for supporting the instrument board, the end of the dash being cut away, the section being taken on line III—III of Fig. II, and, Fig. IV is a fragmentary, detail sectional view taken substantially on the line IV—IV of Fig. II.

In the drawings, similar reference numerals refer to similar parts throughout the several views, and the sectional views are taken looking in the direction of the little arrows at the ends of the section line.

The present invention is in the nature of an improvement over that shown and described in my co-pending application for motor vehicles, filed Sept. 12, 1917, Serial No. 190,966.

Referring to the drawings, 10 represents the side frame members by which the floor 11 and engine 12 are supported in the usual manner. To each side member 10 of the frame, uprights or standards 13 are secured by means of the bolts 14, said standards being secured to the frame about in line with the rear end of the engine. These standards 13 are braced by means of the diagonally extending braces 15 which are secured at their lower ends to the frame members 10 by means of the bolts 16 and which are preferably welded at 17 to the standard 13.

The toe board 18 is disposed above said braces and the clutch actuating lever 19 is adapted to be operated by the pedal 20 which extends through the toe board, and the gear shift lever is represented at 21.

The dash board 22 is provided with a forwardly extending marginal flange 29 and said dash is disposed with its forward face upon the upper rear faces of the standards 13 from a point just above the upper ends of the braces 15.

The rearwardly and upwardly extending arms 23 are secured to the standards 13 by means of the bolts 24, which also extend through the dash and thus secure both the arms and the dash to the standards 13. The arms 23 carry the instrument board 25, which is secured thereto by means of the bolts 26.

The hood covering the engine is represented by dotted lines at 27, and the cowl portion of the body is similarly represented at 28, and it will be seen that the construction is such that the hood and cowl can be placed in position on the frame and extended over the front and upper edges of the instrument and dash boards, as clearly shown by dotted lines in Fig. I.

An oblong opening 32 is provided in the dash for receiving the fuel tank 33. Substantially surrounding said opening is a rearwardly extending integral flange 31. The fuel tank 33 is mounted in said opening and secured to said flange preferably by soldering or welding, the larger portion of the tank being extended forwardly from the dash and the smaller portion rearwardly between the arms 23 to a point adjacent the instrument board 25.

The fuel tank 33 is formed preferably of two pressed sections of similar construction, each having a marginal flange forming, when united or connected by any suitable means, a rib 34 extending around the tank at substantially the center line thereof.

Notches 35 are formed in the dash 22 and the flange 31 is cut adjacent the notches at diametrically opposite points relative to the opening 32 to accommodate the rib or flange 34 on the fuel tank. The tank is preferably held in position by being soldered to the flange 31 and is so proportioned and located upon the dash that its center of gravity is substantially at the point of support, which is the flange, whereby said tank is properly balanced upon the dash and therefore requires no additional supporting or bracing means. The steering column 36 extends through the lower part of the instrument board and through the toe board forwardly to a position where it engages the steering mechanism supported near the front of the engine.

A groove or recess is provided in the lower rear portion of the fuel tank to accommodate the steering post.

A conduit leading from the fuel tank 33 is shown at 37 and is connected with the tank through a cut-out cock 38.

A filling opening at the upper forward end of the fuel tank is protected by the screw cap 39, this opening being in front of the dash and near the rear end of the hood 27 and in such position that it is accessible upon lifting the hood.

On the upper central part of the dash 22 is mounted the rear end of the tie or brace rod 30 connecting the dash to the radiator, (not shown). The rear end of the rod 30 extends through an opening in the dash 22 and through the reinforcing plate 40 which rests at its upper edge upon the rear face of the angle iron 41 and at its lower edge upon the filling strip 42 which engages the flange 31 of the dash, as shown in Fig. IV. The rear end of the rod is held rigidly upon the dash by means of the clamping nuts 43 and 44, the former being disposed on the front face of the dash and the latter upon the rear face of the reinforcing strip 40.

From the description of the parts given above, the construction of this device should be very readily understood. It will be apparent that the dash, the fuel tank and the instrument board are all supported directly upon the frame by the standards 13 which are braced by the diagonal braces 15, all forming a unitary frame structure of rigidly connected parts. The fuel tank is supported directly and entirely by the dash, being extended through said dash and having its side walls united with the flange 31 extending rearwardly from the dash. The front end of the fuel tank extends over the engine in position to render the filling cap 39 accessible when the hood is raised. By supporting the tank in the cowl of the vehicle and beneath the engine hood, I provide means whereby the tank can be filled by raising the hood when desired. This eliminates the spilling of gasolene in the driver's compartment, which sometimes occurs when a tank carried in the cowl has its filling nozzle extending through the instrument board.

The fuel tank is so proportioned that its center of gravity is approximately at the line of support upon the dash and hence there is little tendency for it to turn thereon. Furthermore, the extending of the flange 31 entirely around the tank affords a very staunch and secure connection between these parts and one which will not work loose under excessive conditions of use.

If it is desired to remove the fuel tank for repair, this may be done by taking out the bolts 14 which secure the standards 13 to the frame, and the bolts 16 which secure the braces 15 to the frame. The bolts 26 connecting the instrument board to the arms 23 are then removed and the standards, the dash, the tank and the arms can be lifted out over the engine through the opening covered by the hood 27, or, if desired, the rods 30 disconnected and the bolts 24 removed to permit the tank and dash to be lifted out without disturbing the arms or standards. It will furthermore be apparent that since the tank is directly carried by the frame and permanently supported thereon, the body may be applied and removed without having to disconnect or reposition the tank. This is convenient where the cars are driven in test form with a bare chassis as it is not necessary to afterward alter the position of the tank prior to mounting the body on the chassis, and said body can be merely set in place on the frame over the tank and the instrument board and dash without any relative change of these parts.

I am aware that the particular embodiment of my invention, which I have here shown and described, is susceptible of considerable variation without departing from the spirit thereof, and, therefore, I desire to claim my invention broadly, as well as specifically, as indicated by the appended claims.

Having thus described my invention, what

I claim as new and desire to secure by Letters Patent, is:

1. In a motor vehicle, the combination of a vehicle frame, a pair of separate standards carried by said frame, a dash secured to said standards and a fuel tank projecting through said dash and adapted to be supported thereby.

2. In a motor vehicle, the combination of a vehicle frame, a pair of standards carried by said frame, a dash secured to said standards, a pair of arms secured to said standards and projecting from said dash, a fuel tank projecting through and supported by said dash and having a portion extending rearwardly between said arms, and a brace rod connected with said dash.

3. In a motor vehicle, the combination of a vehicle frame, a pair of standards carried by said frame, a dash carried by said standards, a pair of arms extending rearwardly from said dash, an instrument board secured to the rear ends of said arms, and a fuel tank projecting through and carried by said dash and having a portion extending between said arms.

4. In a motor vehicle, the combination of a vehicle frame, a pair of standards carried by said frame, a dash secured to said standards, a steering column extending forwardly between said standards, a pair of arms extending rearwardly from said standards, an instrument board carried by the rear ends of said arms and a fuel tank projecting through and supported by said dash above said steering column.

5. In a motor vehicle, the combination of a vehicle frame, a pair of standards carried by said frame, a dash secured to said standards, a steering column extending forwardly between said standards, a pair of arms extending rearwardly from said dash, an instrument board secured to the ends of said arms and a fuel tank projecting through and carried by said dash and extending between said arms, the fuel tank being provided with a recess for accommodating said steering column.

6. In a motor vehicle, the combination with a vehicle frame, of a pair of separate standards connected to said frame, a dash connected to the upper ends of said standards, said dash being provided with an opening therein and having an integral flange substantially surrounding said opening, and a fuel tank extending through said opening and connected to said flange.

7. In a motor vehicle, the combination with a vehicle frame, of a pair of standards carried thereby, a dash connected to the upper ends of said standards, arms secured to said dash and said standards and extending rearwardly therefrom, an instrument board secured to the rear ends of said arms, said dash being provided with an opening therein, and a fuel tank extending through said opening and secured to said dash with a portion extending rearwardly between said arms.

8. In a motor vehicle, the combination with a vehicle frame, of a pair of separate standards carried thereby, a dash secured to the upper ends of said standards and provided with an opening, said dash having a rearwardly extending flange adjacent to the edge of said opening, a fuel tank extending through said opening and connected to said rearwardly extending flange whereby said tank is supported by said dash.

9. In a motor vehicle, the combination with a vehicle frame, of a plurality of upright supports carried thereby, a dash secured to said supports and provided with an opening substantially surrounded by a flange connected with the dash, a fuel tank extending through said opening and secured to said flange, the center of gravity of said tank being substantially at its point of connection with the flange, said tank having a draining connection and a filling opening adjacent said dash.

10. In a motor vehicle, the combination with a vehicle frame, of a dash adapted to be supported upon said frame and having an opening therethrough, upper and lower flanges substantially surrounding said opening, and a tank projecting through the opening in said dash and adapted to be supported by said flanges, said tank being provided with a circumferential flange or rib adapted to extend between said upper and lower flanges and to lie within a slot formed in the dash at each end of said opening.

11. In a motor vehicle, the combination with a vehicle frame, of a dash adapted to be supported upon said frame and a tank projected through said dash and adapted to be supported thereby, said tank being formed of two similar flanged sections connected by uniting the flange of one section with the flange of the other section.

12. In a motor vehicle, the combination of a vehicle frame, a flooring including a toe-board, a pair of standards carried by said frame and provided with portions serving to assist in supporting the toe-board in inclined position, a dash secured to said standards, and a fuel tank projecting through said dash and adapted to be supported thereby.

13. In a motor vehicle, the combination of a frame, a dash board, a fuel tank projecting through said dash, and an instrument board, all supported directly from said frame and independently of the vehicle body while in position to be engaged by and inclosed within the cowl of the vehicle body when the vehicle body is secured in position on said frame.

14. In a motor vehicle, the combination of a vehicle frame, a pair of standards carried by said frame, a dash board secured to said standards, a pair of arms secured to said standards and projecting from said dash board, and a fuel tank mounted between said arms and projecting through said dash board.

15. In a motor vehicle, the combination of a frame, a dash board carried by said frame, a pair of arms extending rearwardly from the dash board, and a fuel tank projecting through the dash board and having a portion thereof located between the rearwardly extending arms.

16. In a motor vehicle, the combination of a frame, a dash board carried by said frame, arms extending rearwardly from said dash board, an instrument board carried by the rearwardly extending arms, and a fuel tank projecting through the dash board and having a portion thereof located between the rearwardly extending arms.

In testimony whereof I affix my signature.

EDWARD HALE BELDEN.